United States Patent [19]

Tsuji et al.

[11] Patent Number: 4,477,148

[45] Date of Patent: Oct. 16, 1984

[54] OPTICAL LOW-PASS FILTER

[75] Inventors: Sadahiko Tsuji; Akira Tajima, both of Kanagawa, Japan

[73] Assignee: Canon Kabushiki Kaisha, Tokyo, Japan

[21] Appl. No.: 377,569

[22] Filed: May 12, 1982

[30] Foreign Application Priority Data

May 13, 1981 [JP] Japan .................. 56-68073[U]

[51] Int. Cl.³ .................. G02B 27/00; G02B 5/04; H04N 5/72
[52] U.S. Cl. .................. 350/286; 350/167; 358/55; 358/226; 358/251; 358/253
[58] Field of Search .................. 350/167, 286, 162.11, 350/162.17; 358/44, 55, 142, 226, 251, 253

[56] References Cited

U.S. PATENT DOCUMENTS

| 3,213,753 | 10/1965 | Rogers | 350/167 |
| 3,653,747 | 4/1972 | Vogelnik | 358/55 |
| 3,821,795 | 6/1974 | Okano | 358/44 |
| 4,178,611 | 12/1979 | Okano | 358/44 |

*Primary Examiner*—Bruce Y. Arnold
*Assistant Examiner*—William Propp
*Attorney, Agent, or Firm*—Toren, McGeady and Stanger

[57] ABSTRACT

An optical low-pass filter is comprized of micro stripe prisms arranged on the surface of a transparent member. A transmissive medium which is of different refractive index from that of air is used to fill the grooves of the microprisms to permit the arrangement to have micro stripe prisms with a large vertex angle.

2 Claims, 5 Drawing Figures

OPTICAL LOW-PASS FILTER

BACKGROUND OF THE INVENTION

1. Field of the Invention

This invention relates to an optical low-pass filter for a color TV camera using a stripe filter for color separation and more particularly to an optical low-pass filter effectively usable for a color TV camera of the frequency division type.

2. Description of the Prior Art

A color TV camera of the type using a stripe color separating filter necessitates the use of a low-pass filter to cut off high spatial frequency. The prior art low-pass filters that have been proposed for this purpose include a filter using a double refraction plate, a filter using lenticular lenses, a filter using a phase grating, etc. Among these low-pass filters, a filter using a double refraction plate of crystal has been commercialized. The expense of crystal, has created a general desire for an inexpensive low-pass filter. To meet this desire, there have been made some proposals including, for example, stripe prisms disclosed in Japanese Laid-Open Patent Application No. SHO 55-38549.

In the accompanying drawings, FIG. 1 shows a conventionally known low-pass filter of the prism type. On one side of the low-pass filter 1, there are formed stripe prisms 2. Each of these prisms 2 has a vertex angle $\delta$. Assuming that refractive index of the prism 2 is n, the angle of deviation $\theta$ of a ray of light passing through filter 1 is obtainable from the formula $n \cdot \sin \delta = \sin(\delta + \theta)$. Since $\delta$ and $\theta$ are small, and therefore $\sin \delta \approx \delta$, $\sin \theta = \theta$ in radian, the single $\theta$ can be expressed by $\theta = (n-1) \cdot \delta$. Assuming that the lens system in use is a telecentric system and that the distance between separated images at a distant point a is d, there is a relation expressed by $d = 2\theta \cdot a$. Applying this to a ⅔ inch image pick-up tube and assuming that the color carrier frequency is 3.58 MHz, the distance d required between separated image is d=0.02 mm. Then, assuming n=1.5 and a=8 mm, the vertex angle $\delta$ becomes $\delta \approx 8.6'$. In cases where the lens system is not a telecentric system obtaining uniform separation over the whole image format, is achieved by positioning the filter within a parallel pencil of rays in front of the relay part of a zoom lens which corresponds to a pupil position of the whole optical system. The distance d between separated images can be expressed by $d = 2\theta fR$, where fR represents the focal length of the relay lens system. In this case with a focal length of 30 mm, the vertex angle $\delta$ of the prisms 2 must be $\delta \approx 2.3'$. The value of the vertex angle $\delta$ thus obtained is almost equal to the finishing precision, therefore, a manufacturing problem is presented.

SUMMARY OF THE INVENTION

It is an object of the invention to provide an optical low-pass filter which permits the stripe micro prisms thereof to have a large vertex angle. In accordance with the invention, this object is attained by filling up the grooves of the prisms with an optical medium which has a smaller refractive index difference than the difference in refractive index between the prisms and air.

The object, features and advantages of the invention will become apparent from the following detailed description of preferred embodiments thereof taken in connection with the accompanying drawings.

DETAILED DESCRIPTION OF PREFERRED EMBODIMENTS

Figure 1:
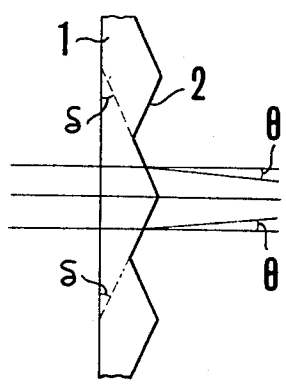
FIG. 1 is a sectional view showing the conventional low-pass filter consisting of stripe micro prisms. Other drawings illustrate optical low-pass filters as embodiment examples of the present invention.
Figure 2:
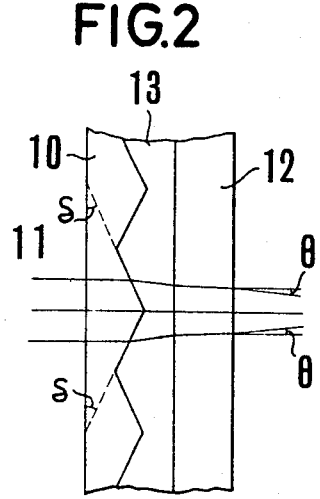
FIGS. 2, 3, 4 and 5 are sectional views respectively showing first, second, third and fourth embodiments of the invention.

FIG. 2 shows the first embodiment of the invention, a first transmission member 10 is on one side of the stripe micro prisms 11. Each prism 11 has a vertex angle $\delta$. There is a second transmission member 12 which has parallel planes in parallel with the first transmission member 10. The space between the first and second members, 10 and 12, is filled with a layer of a clear adhesive 13.

Assuming that the refractive index of the first transmission member 10 is $n_1$ and that of the adhesive layer is $n_b$, the angle of deviation $\theta$ is expressed by $\theta \approx |n_1 - n_b| \cdot \delta$. Now, assuming that the distance d between separated images is 0.02 mm, $n_1 = 1.5$ and $n_b = 1.53$, the vertex angle $\delta$ of the prism 11 is $\delta = 38.2'$. Further, because the second transmission member 12 has parallel planes, the refractive index of this medium, $n_2$, has no influence on the calculation.

The vertex angle $\delta$ of the prisms 11 thus obtained is substantially large enough to permit high precision machining with a machine tool. Therefore, the microprisms 11 arranged in a stripe manner can be formed with a high degree of precision. Further, where this filter is to be positioned in an image space, it is preferable to use an optical system of the type called a telecentric optical system which has the exit pupil position at infinity. If the optical system is not a telecentric system the low-pass effect varies with image height. To remove this defect the filter will be set in the pupil position.

Figure 3:
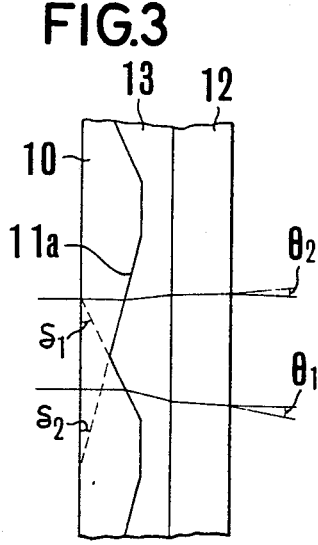

In the second embodiment, of the invention, shown in FIG. 3, the low-pass filter is arranged in the same manner as in the first embodiment, shown in FIG. 2, with the exception of that the stripe micro prisms 11 of the first transmission member 10 are formed in this case into stripe micro prisms 11a each of which has a plurality of vertex angles $\delta_1$ and $\delta_2$. The angles of deviation $\theta_1$ and $\theta_2$ and the distance d between separated images can be obtained from the same calculation formulas as those given above.

Figure 4:
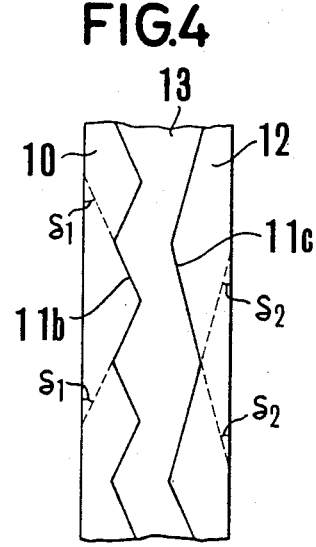

In the case of the third embodiment, shown in FIG. 4, both the first and second transmission members 10 and 12 are provided with stripe micro prisms 11b and 11c, which respectively have vertex angles $\delta_1$ and $\delta_2$. In this particular embodiment, the refractive index $n_2$ of the second transmission member 12 must be involved in the calculation formulas. The first and second transmission members 10 and 12 do not have to be of the same refractive index. Further, even if their prisms 11b and 11c have the same vertex angle, the spatial sine-wave response of the filter can be adjusted by varying the distance between the members 10 and 12.

Figure 5:
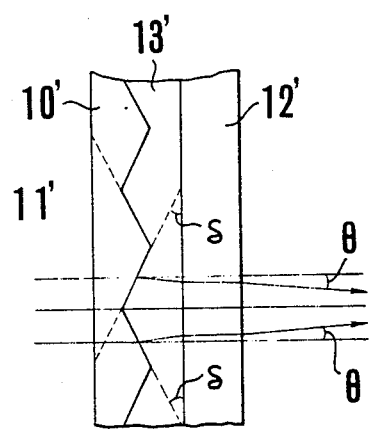

The fourth embodiment of the present invention is as shown in FIG. 5. In this embodiment, the relation between the refractive index of the transmission member 11' having the stripe prisms 10' and that of the adhesive 13' is arranged to be in the reverse of the relation in the preceding embodiment examples. However, the absolute value of difference in refractive index between the prism 10' and the adhesive 13' is arranged to be smaller than the difference in refractive index between the prism 10' and air. Therefore, the fourth embodiment also permits the prisms 10' to have a large vertex angle.

The optical low-pass filter according to the invention can be made from a molded plastic material to permit cost reduction. Another advantage of the invention is that the large vertex angle of the prisms greatly decreases the chance of a manufacturing error.

What is claimed is:

1. An optical low-pass filter comprising:
   (a) first and second transmission members respectively having a stripe micro prism formed on one surface thereof, said micro prism of the first transmission member having a shape different from that of the micro prism of the second transmission member; and
   (b) a transmissive layer provided between the micro prism surface of the first transmission member and the micro prism surface of the second transmission member, said transmissive layer filling up a space between the first and second transmission members and consisting of an adhesive having a refractive index different from that of air.

2. An optical low-pass filter according to claim 1, wherein the vertex angle of the micro prism of the first transmission member is different from that of the micro prism of the second transmission member.